(12) United States Patent
Bojanowski et al.

(10) Patent No.: US 10,730,144 B2
(45) Date of Patent: Aug. 4, 2020

(54) LOCALIZED TEMPERING OF CARBURIZED STEEL

(71) Applicant: Ford Motor Company, Dearborn, MI (US)

(72) Inventors: Paul John Bojanowski, Macomb Township, MI (US); Tony Hayden, Troy, MI (US)

(73) Assignee: Ford Motor Company, Dearborn, MI (US)

( * ) Notice: Subject to any disclaimer, the term of this patent is extended or adjusted under 35 U.S.C. 154(b) by 288 days.

(21) Appl. No.: 15/657,881

(22) Filed: Jul. 24, 2017

(65) Prior Publication Data

US 2019/0022798 A1 Jan. 24, 2019

(51) Int. Cl.
| | |
|---|---|
| *B23K 26/323* | (2014.01) |
| *H05B 6/40* | (2006.01) |
| *H05B 6/10* | (2006.01) |
| *B23K 26/60* | (2014.01) |
| *C21D 1/18* | (2006.01) |
| *C21D 9/32* | (2006.01) |
| *F16H 48/40* | (2012.01) |
| *C21D 6/00* | (2006.01) |
| *C21D 1/42* | (2006.01) |
| *F16H 48/38* | (2012.01) |
| *B23K 101/00* | (2006.01) |
| *B23K 103/04* | (2006.01) |

(Continued)

(52) U.S. Cl.
CPC ............ *B23K 26/323* (2015.10); *B23K 26/60* (2015.10); *C21D 1/18* (2013.01); *C21D 6/00* (2013.01); *C21D 9/32* (2013.01); *F16H 48/40* (2013.01); *H05B 6/101* (2013.01); *H05B 6/102* (2013.01); *H05B 6/405* (2013.01); *B23K 2101/008* (2018.08); *B23K 2103/04* (2018.08); *B23K 2103/06* (2018.08); *B23K 2103/18* (2018.08); *C21D 1/42* (2013.01); *C21D 2221/00* (2013.01); *F16H 2048/382* (2013.01); *F16H 2048/385* (2013.01)

(58) Field of Classification Search
None
See application file for complete search history.

(56) References Cited

U.S. PATENT DOCUMENTS

| | | | | |
|---|---|---|---|---|
| 4,154,628 | A | * | 5/1979 | Dudek ...................... C21D 9/32 118/505 |
| 4,885,831 | A | * | 12/1989 | Fett .......................... C21D 9/32 148/573 |

(Continued)

OTHER PUBLICATIONS

De Graaff, Bernhard et al., Investigation on Short Time Tempering by Induction Heating of the low alloyed AlSl4140 steel, Conference Paper, European Conference on Heat Treatment and 21st IFHTSE Congress, May 2014, Munich, DE.

*Primary Examiner* — Alexandra M Moore
*Assistant Examiner* — Adil A. Siddiqui
(74) *Attorney, Agent, or Firm* — Burris Law, PLLC (57) ABSTRACT

A method for joining a carburized steel workpiece to a cast iron workpiece is provided that includes tempering a localized area of the carburized steel workpiece, machining the localized area to reduce carbon content, and welding the carburized steel workpiece to the cast iron workpiece at the localized area. The tempering may be performed by induction heating and results in a hardness profile of the localized area of less than 50 HRC.

13 Claims, 7 Drawing Sheets

(51) Int. Cl.
*B23K 103/06* (2006.01)
*B23K 103/18* (2006.01)

(56) References Cited

U.S. PATENT DOCUMENTS

| | | | | |
|---|---|---|---|---|
| 5,390,414 | A * | 2/1995 | Lisowsky | B22F 5/08 |
| | | | | 29/893.34 |
| 6,315,841 | B1 | 11/2001 | Fisher et al. | |
| 6,982,120 | B2 | 1/2006 | Schuster | |
| 7,540,402 | B2 | 6/2009 | McCrink et al. | |
| 9,328,811 | B2 * | 5/2016 | Iwata | C21D 9/32 |
| 9,410,222 | B2 | 8/2016 | Batiste et al. | |
| 2006/0153485 | A1 * | 7/2006 | Maeda | F16O 19/30 |
| | | | | 384/569 |
| 2006/0243353 | A1 * | 11/2006 | Milam | B23K 11/0033 |
| | | | | 148/524 |
| 2012/0247619 | A1 * | 10/2012 | Obayashi | C21D 1/06 |
| | | | | 148/233 |
| 2015/0013848 | A1 * | 1/2015 | Berruet | B23P 15/00 |
| | | | | 148/223 |
| 2015/0259771 | A1 * | 9/2015 | Vartanov | C22C 38/50 |
| | | | | 148/318 |
| 2017/0058374 | A1 * | 3/2017 | Matsui | C21D 9/085 |
| 2018/0104762 | A1 * | 4/2018 | Kadoya | B23K 11/241 |
| 2018/0142771 | A1 * | 5/2018 | Zhang | F16H 48/40 |

* cited by examiner

LOCALIZED TEMPERING OF CARBURIZED STEEL

FIELD

The present disclosure relates to methods of processing of carburized steels, and more particularly carburized steels for use in hypoid or spiral bevel ring gears in power-train components.

BACKGROUND

The statements in this section merely provide background information related to the present disclosure and may not constitute prior art.

To reduce weight and increase strength in power-train components such as hypoid differential assemblies, laser welding has been utilized to join various components together such as carburized steel hypoid ring gears and nodular iron differential cases.

Concerns in the art of welding nodular iron to steel are known and typically a joined weld pool should have a carbon content below 1.2 weight percent (wt %.) to prevent weld failures. Manufacturers attempt to reduce the carbon content by removing the carburized layer from the hypoid ring gear thru machining or utilizing carbon blocking pastes or physical alloy caps in the heat treatment process to prevent carbon from diffusing into the steel. Machining hardened steel components involves both a high machining time and low tool life.

These methods have inherent issues such as variability in the blocking of carbon diffusion, which leaves hard zones unknown to the subsequent hard machining operations. The variability in the blocking of carbon diffusion is also an area of potential weld failure if the carbon is insufficiently removed.

Further, tools used to machine the carburized surface are expensive and must be replaced regularly due to the large amount of wear from machining the carburized surface. The alloy caps used to prevent carbon from diffusing into the steel yield inconsistent results. These inconsistent results can cause tool failures when the tooling encounters the hardened portions. The carbon blocking pastes are messy, yield inconsistent results, and reduce the service life of furnace bricks and require additional exhaust procedures.

Typically, when the material hardness Rockwell C scale (HRC) exceeds 50 (>50 HRC) hard machining is necessary to create the precise weld joint geometry and remove the total effective case back to the parent metal carbon content typically <0.25 wt %. Removal of the total effective case through machining (hard turning) is typically done with cubic boron nitride (CBN) tooling and requires multiple shallow cuts to remove material without catastrophic tool failure. The shallow depths of cut increase the cycle time, however, the tool life may still be inadequate.

The issues of increased cycle time, inadequate tool life, and other gear welding issues are addressed by the present disclosure.

SUMMARY

In one form of the present disclosure, a method of joining a carburized workpiece to a cast iron workpiece is provided. The method comprises tempering a localized area of the carburized steel workpiece and machining the localized area to reduce carbon content. The method further comprises welding the carburized steel workpiece to the cast iron workpiece at the localized area.

In variations of this method, the machining is performed using carbide tooling, the carbon content is reduced below about 0.25 wt %, and the tempering is performed by induction heating. In one form, the induction heating comprises heating coils configured to match a profile of the localized area. In various forms of the method, the tempering is between about 600° F. and about 1,200° F., the carbon content is reduced without a carbon blocking paste or an alloy cap, and the welding is laser welding.

In at least one form of the method, the carburized steel workpiece is a hypoid or spiral bevel ring gear and the cast iron workpiece is a differential case.

In another form of the present disclosure, a method for preparing a carburized steel workpiece for subsequent welding is provided. The method comprises tempering a localized area of the carburized steel workpiece to reduce its HRC such that the localized area can be machined with carbide tooling to reduce carbon content below about 0.25 wt %.

In variations of this method, the tempering results in a hardness profile of the localized area less than 50 HRC, the tempering is performed by induction heating, and in one form the induction heating comprises heating coils configured to match a profile of the localized area. In one form, the tempering is between about 600° F. and about 1,200° F.

In at least one form of the method, the carburized steel workpiece is a hypoid or spiral bevel ring gear.

In yet another form of the present disclosure, a method for joining a carburized steel workpiece to a cast iron workpiece is provided. The method comprises induction tempering a localized area of the carburized steel workpiece such that the hardness profile of the localized area is less than 50 HRC and machining the localized area to reduce carbon content below about 0.25 wt %. The method further comprises welding the carburized steel workpiece to the cast iron workpiece at the localized area.

In variations of this method, the induction heating comprises heating coils configured to match a profile of the localized area and the carburized steel workpiece is be rotated within the heating coils. Moreover, the tempering for this method is between about 600° F. and about 1,200° F.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Methods for improving machinability of carburized steel and decreasing hard machining cycle time is provided. The methods include high temperature induction tempering of specific regions (also referred to as "localized areas") of carburized parts such that the hardness profile is reduced to less than 50 HRC. The hardness profile is reduced prior to hard machining thus allowing the use of standard carbide tooling which has a depth of cut greater than four (4) times CBN tooling. The larger depth of cut for standard carbide tooling reduces the hard machining cycle time and increases tool life.

As set forth in greater detail below, these methods include an induction coil designed for the specific geometry of the zone to be induction tempered. Frequency modulation of the induction coil controls surface and sub-surface heating, thus reducing heat affected zones. Under these methods, the micro-structure becomes uniform and predictable with induction temperatures between about 600° F. and about 1,200° F. for improving hard turning parameters. In general, the methods according to the teachings of the present disclosure improve the machinability of carburized steel for weld joints between steel and cast iron.

Figure 1:
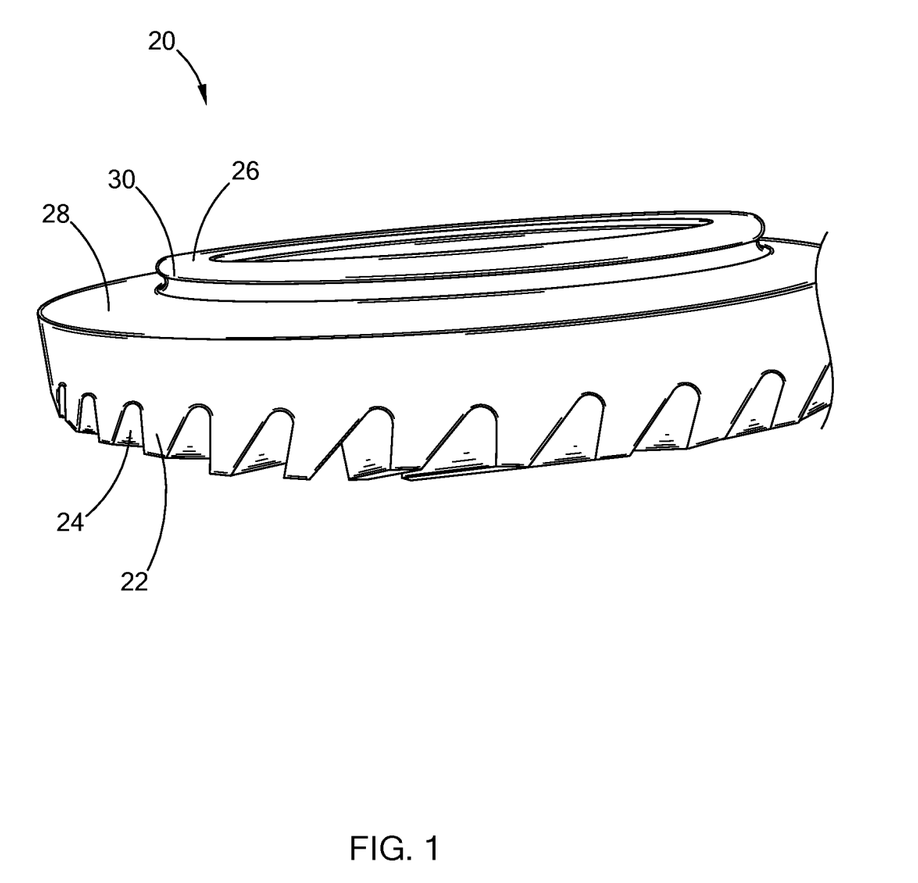
FIG. 1 is a perspective side view of an exemplary gear to be prepared according to the teachings of the present disclosure.
Figure 2:
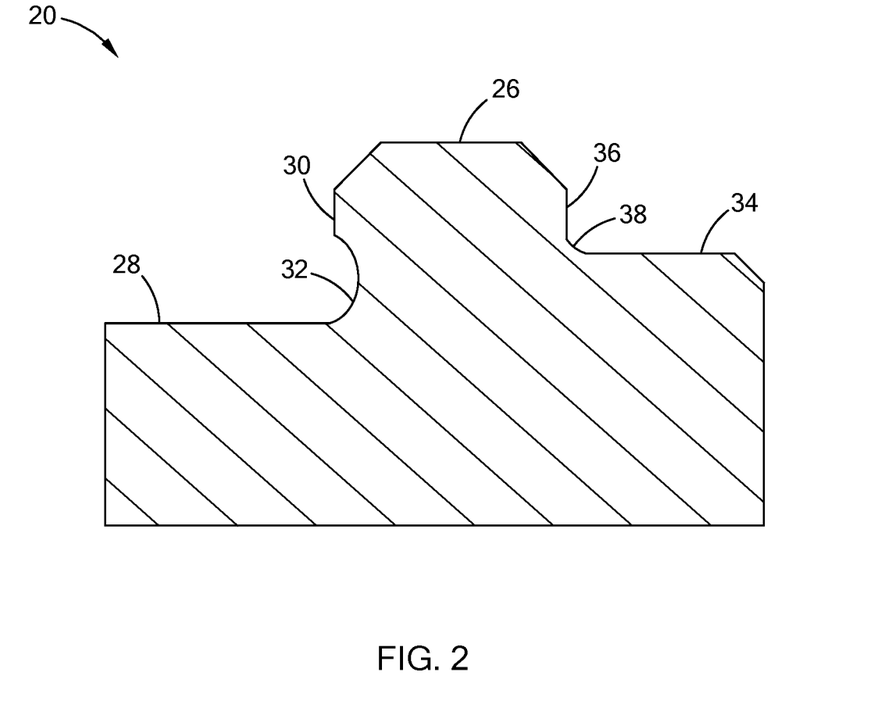
FIG. 2 is a side cross-sectional view of an exemplary gear to be prepared according to the teachings of the present disclosure.

Referring to FIGS. 1 and 2, an exemplary gear 20 to which the teachings of the present disclosure are applied generally includes multiple gear teeth 22, a gear webbing 24 situated between successive gear teeth 22, a nose 26, an outside face 28, and an outside flank 30. The gear 20 also includes an outside radius 32, an inside face 34, an inside flank 36, and an inside radius 38. These areas are referred to herein as "localized areas" or a "localized area" and it should be understood that only these areas of the gear 20 are treated according to the methods of the present disclosure. Other areas of the gear 20 are not treated because they are not subsequently joined to a cast iron workpiece, and such treatment negatively affects the strength of the gear 20 in these other areas. Therefore, the teachings of the present disclosure are focused on a localized treatment of an area of the gear that is subsequently welded to a cast iron workpiece.

Figure 3:
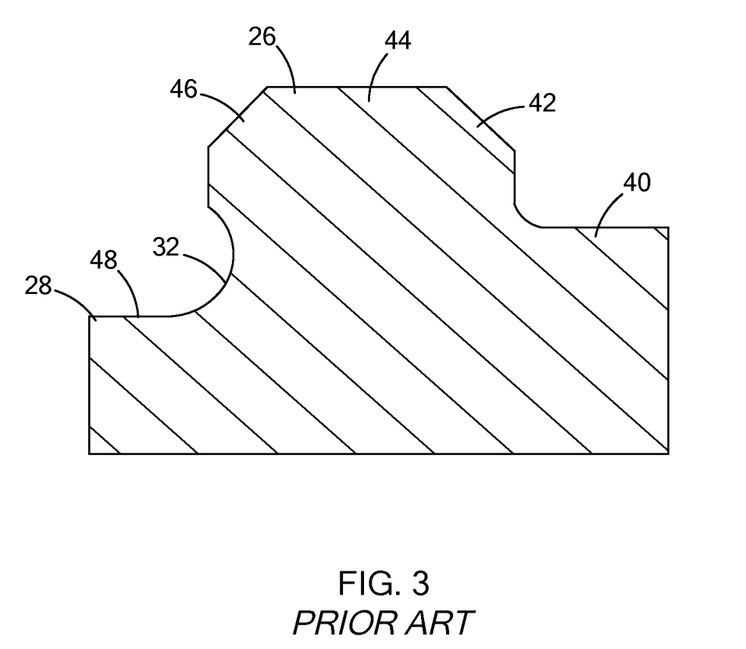
FIG. 3 is a side cross-sectional view depicting varying hardening depths of penetration of an exemplary gear prepared according to the prior art.

Referring to FIG. 3, a gear prepared according to the prior art illustrates depth at 50 HRC at various locations 40, 42, 44, 46 and 48. Batches of gears were carburized and prepared to measure the hardness at locations 40 through 48 as shown in FIG. 3 and Table 1 below.

TABLE 1

| Batch # | #1 | #2 | #3 | #4 | #5 | Tooth Pitchline |
|---|---|---|---|---|---|---|
| Effective Case Depth Measurement @ HRC 50, In: | | | | | | |
| #1 | 0.076 | 0.085 | 0.069 | 0.081 | 0.075 | 0.064 |
| #2 | 0.033 | 0.049 | 0.048 | 0.046 | 0.030 | 0.047 |
| #3 | 0.042 | 0.051 | 0.048 | 0.048 | 0.037 | 0.052 |
| #4 | 0.050 | 0.063 | 0.058 | 0.064 | 0.048 | 0.060 |
| Rockwell Hardness @ .085" depth from surface: | | | | | | |
| | | | | | | Tooth Core Hardness |
| #1 | 47 | 47 | 46 | 47 | 46 | 36 |
| #2 | 34 | 38 | 39 | 40 | 34 | 32 |
| #3 | 38 | 39 | 40 | 42 | 36 | 32 |
| #4 | 44 | 45 | 45 | 46 | 38 | 36 |

Hardness measurements were taken at depths corresponding to an HRC of 50 and at 0.085 inches from the surface of the gear 20. As shown in Table 1, the hardness measurements vary in depth from surface and location on the gear 20. These hardness variations increase tooling wear and costs. More specifically, tool life issues were experienced due to the varied case depth position and thus how to predict when to adjust tool feed/speed.

Figure 4:
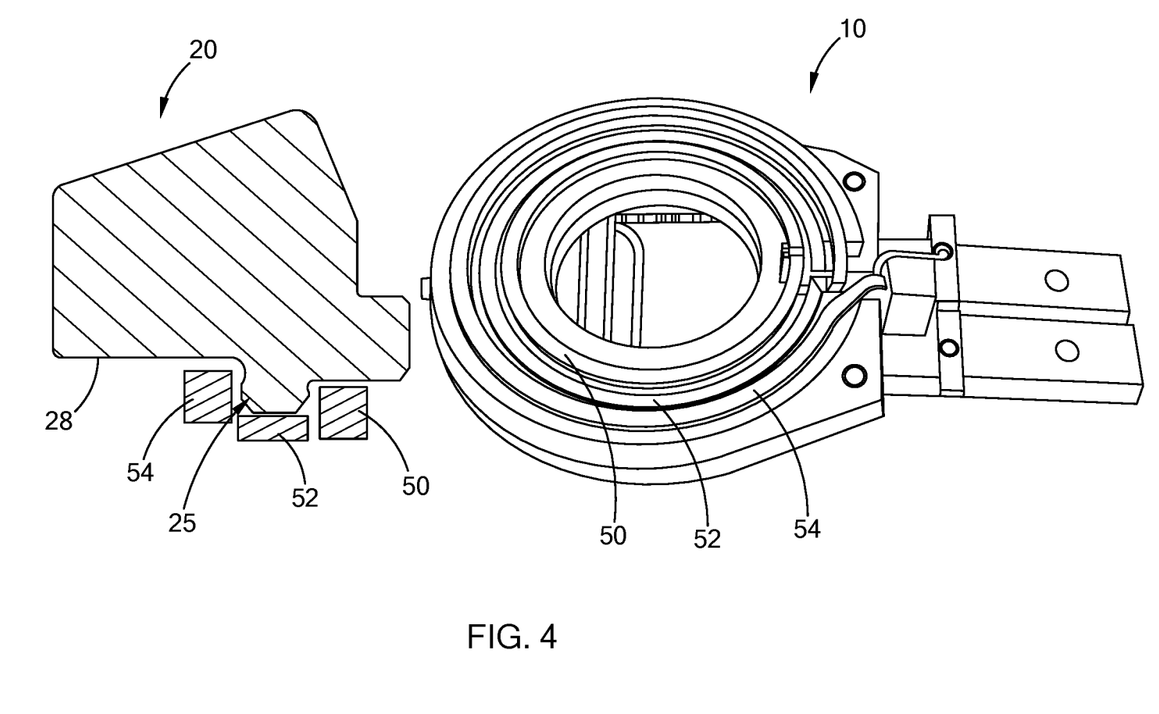
FIG. 4 illustrates induction heating of an exemplary gear according to the teachings of the present disclosure.

Referring to FIG. 4, an exemplary induction heater 10 of the present disclosure is provided. In this form, the induction heater 10 is a three-turn coil that includes induction heating coils 50, 52, and 54, which are configured to match a profile of the localized area 25. The induction coils 50 through 54 correspond to locations on the gear 20 where tempering is desired. Each induction coil 50 through 54 may be heated to a different temperature to vary the rate of tempering. In this form, induction coil 50 tempers regions inside face 34, inside flank 36, and inside radius 38, induction coil 52 tempers the nose 26, outside flank 30, and inside flank 36, and induction coil 54 tempers the outside face 28, outside flank 30, and outside radius 32.

Figure 5:
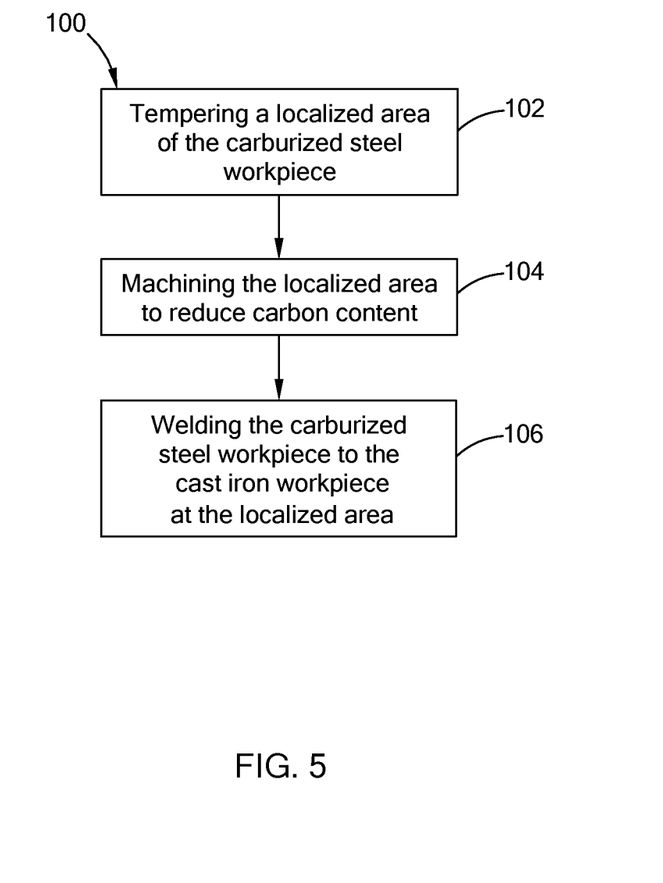
FIG. 5 is a flow diagram illustrating a method of joining a carburized steel workpiece to a cast iron workpiece according to the teachings of the present disclosure.

Referring now to FIG. 5, a method of joining a carburized steel workpiece to a cast iron workpiece according to the present disclosure is illustrated in a flow diagram and represented by reference numeral 100. Method 100 comprises tempering a localized area of the carburized steel workpiece in step 102. In step 104, the localized area is machined to reduce carbon content, and in step 106 the carburized steel workpiece is welded to the cast iron workpiece at the localized area.

The tempering should result in a hardness profile of the localized area less than 50 HRC so that this area can be machined with less expensive tooling. More specifically, less expensive tooling may include carbide tooling. The inventors have discovered that machining the localized areas such that the carbon content is below about 0.25% by weight inhibits weld failures. As set forth above, the tempering may be performed by induction heating, wherein induction coils are configured to match the profile of the localized area. Further, for this specific application and material of the localized area, namely, carburized steel, the tempering is between about 600° F. and about 1,200° F. The workpiece having the localized area may include a hypoid ring gear or spiral bevel ring gear, where the cast iron workpiece is a differential case. It should be understood, however, that the methods of the present disclosure may be applied to other part/workpieces in a various applications and thus these power-train components are merely exemplary and should not be construed as limiting the scope of the present disclosure. Since the carbon content is reduced below about 0.25% for subsequent welding, the present disclosure does not require the use of a carbon blocking paste or an alloy cap, thus reducing costs and improving quality of the weld. In one form, laser welding is used to join the carburized steel workpiece to the cast iron workpiece, although other forms of welding may be employed while remaining within the scope of the present disclosure.

Figure 6:
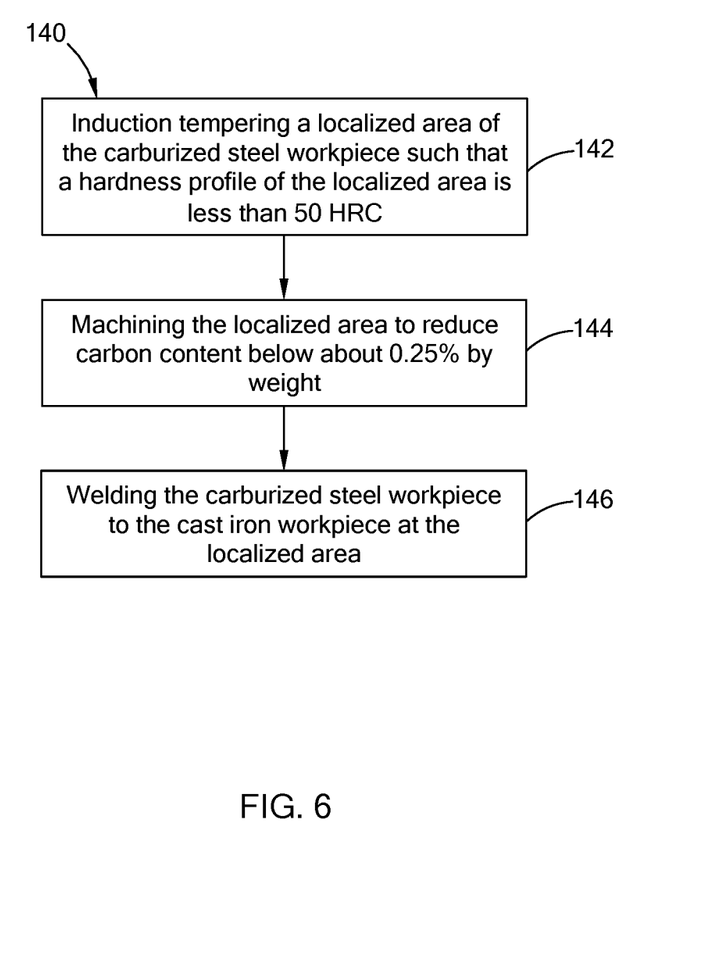
FIG. 6 is a flow diagram illustrating another method of joining a carburized steel workpiece to a cast iron workpiece according to the teachings of the present disclosure.

Referring now to FIG. 6, another method of joining a carburized steel workpiece to a cast iron workpiece according to the present disclosure is illustrated in a flow diagram and represented by reference numeral 140. The method 140 comprises induction tempering a localized area of the carburized steel workpiece such that a hardness profile of the localized area is less than 50 HRC at step 142. In step 144, the localized area is machined to reduce carbon content below about 0.25% by weight. In step 146, the carburized steel workpiece is welded to the cast iron workpiece at the localized area.

Testing

Figure 7:
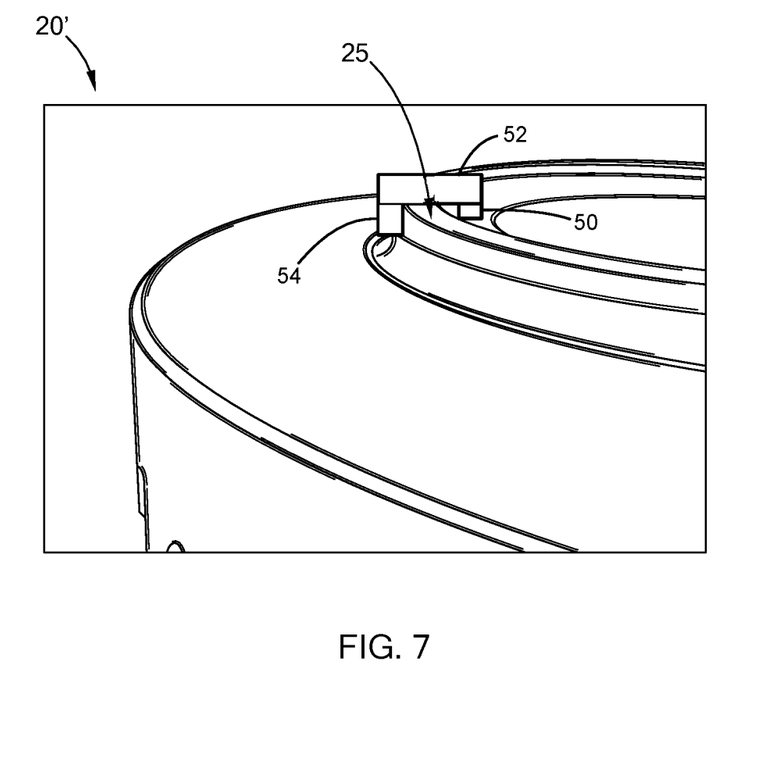
FIG. 7 is a side view of an exemplary gear prepared according to the teachings of the present disclosure.

According to the methods of the present disclosure, several workpieces were treated and tested to reduce HRC below 50 prior to welding. Results of testing are shown below in Tables 2 and 3, which show microhardness results at each of the locations indicated in FIG. 2:

Referring to FIG. 7, a portion of a hypoid ring gear 20' is illustrated that has was prepared according to methods of present disclosure and locally tempered by induction heater 10. The gear 20' was subsequently machined proximate the localized area 25 to reduce the carbon content. This machining trial was successful with carbide tooling, and the cycle time was reduced by at least 60% when compared to prior art processes.

In one form, the gear 20', upon reaching 600 to 1200° F. in the localized region, can be rapidly cooled with water to ambient temperature to allow for subsequent machining operations without necessitating slow air cooling or complex quenching operations.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of joining a carburized steel workpiece to a cast iron workpiece comprising:
    tempering a localized area of the carburized steel workpiece, wherein the carburized steel workpiece is a hypoid or spiral bevel ring gear and the cast iron workpiece is a differential case;
    machining the localized area to reduce carbon content after tempering the localized area; and
    welding the carburized steel workpiece to the cast iron workpiece at the localized area.

2. The method according to claim 1, wherein the tempering results in a hardness profile of the localized area of less than 50 HRC.

3. The method according to claim 1, wherein the machining is performed using carbide tooling.

4. The method according to claim 1, wherein the carbon content is reduced below about 0.25% by weight.

5. The method according to claim 1, wherein the tempering is performed by induction heating.

6. The method according to claim 5, wherein the induction heating comprises heating coils configured to match a profile of the localized area.

7. The method according to claim 1, wherein the tempering is between about 600° F. and about 1,200° F.

8. The method according to claim 1, wherein the carbon content is reduced without a carbon blocking paste or an alloy cap.

9. The method according to claim 1, wherein the welding is laser welding.

10. A method of joining a carburized steel workpiece to a cast iron workpiece comprising:
    induction tempering a localized area of the carburized steel workpiece such that a hardness profile of the localized area is less than 50 HRC;
    machining the localized area to reduce carbon content below about 0.25% by weight after induction tempering the localized area; and
    welding the carburized steel workpiece to the cast iron workpiece at the localized area.

11. The method according to claim 10, wherein the induction heating comprises heating coils configured to match a profile of the localized area.

12. The method according to claim 11, wherein the carburized steel workpiece is rotated within the heating coils.

13. The method according to claim 10, wherein the tempering is between about 600° F. and about 1,200° F.

* * * * *